(12) United States Patent
Walgenbach

(10) Patent No.: US 9,024,187 B2
(45) Date of Patent: May 5, 2015

(54) VENTILATION FOR HORIZONTALLY MOUNTED BUSWAY

(71) Applicant: Schneider Electric USA, Inc., Palatine, IL (US)

(72) Inventor: Jacob E. Walgenbach, Hendersonville, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 211 days.

(21) Appl. No.: 13/687,916

(22) Filed: Nov. 28, 2012

(65) Prior Publication Data
US 2014/0144668 A1    May 29, 2014

(51) Int. Cl.
*H02G 5/10*    (2006.01)

(52) U.S. Cl.
CPC ........................................ *H02G 5/10* (2013.01)

(58) Field of Classification Search
CPC ........................................................ H02G 5/10
USPC ...... 174/70 B, 72 B, 68.2, 71 B, 88 B, 129 B, 174/99 B, 16.2; 361/637, 624, 648, 650, 361/611; 439/212, 213
See application file for complete search history.

(56) References Cited

U.S. PATENT DOCUMENTS

| | | | |
|---|---|---|---|
| 2,903,503 A | 9/1959 | Carlson et al. ................... | 174/99 |
| 3,125,628 A | 3/1964 | Fisher .............................. | 174/16 |
| 3,636,237 A * | 1/1972 | Hafer ........................... | 174/68.3 |
| 3,730,971 A * | 5/1973 | Durham et al. .............. | 174/68.2 |
| 4,714,431 A * | 12/1987 | McGoldrick et al. ......... | 439/212 |
| 4,929,801 A * | 5/1990 | Hibbert ......................... | 174/16.2 |
| 6,689,956 B2 | 2/2004 | Alexander et al. .......... | 174/72 B |

* cited by examiner

*Primary Examiner* — Hoa C Nguyen
*Assistant Examiner* — Amol Patel
(74) *Attorney, Agent, or Firm* — Locke Lord LLP

(57) ABSTRACT

A busway assembly including a plurality of busbars mounted in a horizontal orientation and stacked in a sandwich configuration for conducting electrical current. The busbars are enclosed within a housing having an H-shaped configuration and including side-panels with ventilation chimneys through which hot air circulates from a low area underneath the busbars to an upper area above the busbars. The ventilation chimneys include open-ended half-pipes that are inserted in respective apertures of the side-panels.

20 Claims, 5 Drawing Sheets ized configuration. By way of example, numerous busway manu-
VENTILATION FOR HORIZONTALLY MOUNTED BUSWAY

FIELD OF THE INVENTION

This invention is directed generally to electrical systems, and, more particularly, to a busway assembly with ventilation chimneys for horizontal busbars.

BACKGROUND OF THE INVENTION

A busway as used in an electrical distribution system, which can include a switchboard, switchgear, or motor-control center, includes a housing enclosing a stack of insulated electrical phase conductors called busbars, in prefabricated sections. The sections are joined together to carry the different phases of electrical current from a source of energy to one or more loads. The conductors are typically made of copper and can carry hundreds or even thousands of amperes of current. As a result, these conductors get very hot and efforts are made to cool them so that they meet thermal requirements set by a certification organization such as Underwriters Laboratory (UL). One way to cool conductors is to add more copper by making them thicker or wider, but copper is expensive and more of it adds bulkiness and heft to the busway overall.

There are two types of busways, feeder busways and plug-in busways. Feeder busways feed long (e.g., up to ten feet) straight sections of current, while plug-in busways allow for connections, typically in a perpendicular manner, to the long sections of the busways, to route the current to other areas of an electrical distribution system. To allow for connections to the plug-in busways, some busbar conductors in plug-in busways have flared-out sections to accommodate the busbar conductors from the connections. These flared-out sections create relatively larger air gaps between the busbar conductors so that the connections can fit snugly in between the air gaps to create electrical connections to each phase. The busbar conductors become particularly hot in the areas near points of contact. This is generally because of additional contact resistance at the points of contact which generate increased power losses at the points of contact. The increased power loss coupled with the thermal resistances for the busway system usually cause an increase in temperature at the points of contact.

Multiple busway sections can be connected together using joint packs, which are metal housings with insulated conductive fingers that receive the ends of busbar conductors from different busway sections. As above, the end of each busway section is flared to allow joining These joint packs can also become very hot as they transfer electrical current from one busway to the next. To meet UL or other certification requirements, a certain amount of copper or conductive material needs to be used to ensure that during normal operating conditions the temperatures of the busbar conductors and joint packs do not exceed rated requirements. If the temperature of the busbar conductors and/or the joint packs can be reduced, less copper can be used in both the busbar conductors and the joint packs, which reduces weight and bulk as well as cost, as long as the cost of a thermal mitigation solution does not exceed the cost of the copper reduction.

One specific type of busway is a horizontally mounted busway with a cross-sectional shape having an H-shaped configuration. By way of example, numerous busway manufacturers use an H-shaped configuration on busways rated for 800+ amperes. As mentioned above, busbars generate heat under normal operating conditions due to inherent internal resistance. In addition to the heat generation discussed above, busways with H-shaped configurations create a cavity on the underside where hot air stratifies and decreases the ability of the busway to transfer heat to the environment. This has the undesired effect of further increasing the operating temperature of the busway.

Thus, a need exists for an improved thermal management system for a busway to lower temperatures along the busway under normal operating conditions.

SUMMARY OF THE INVENTION

In an implementation of the present invention, a busway assembly includes ventilation chimneys for allowing airflow circulation to prevent heat build-up underneath of a horizontally mounted busway section. The ventilation chimneys are formed in side-panels of an H-shaped busway housing and include side apertures enclosed by open-ended half-pipes. The busway housing encloses, at least in part, a plurality of stacked busbars. The ventilation chimneys provide a ventilation path that allows hot air to circulate from an area below the busbars to an area above the busbars.

In another implementation of the present invention, a horizontally-mounted busway assembly includes a plurality of busbars stacked in a sandwich configuration for conducting electrical current, the plurality of busbars being mounted in a horizontal orientation. The busway assembly further includes a housing that encloses the plurality of busbars and has an H-shaped configuration. The housing includes side-panels with ventilation chimneys through which hot air circulates from a low area underneath the plurality of busbars to an upper area above the plurality of busbars. The ventilation chimneys include open-ended half-pipes inserted in respective apertures of the side-panels.

In another alternative implementation of the present invention, a horizontally-mounted busway assembly includes a plurality of busbars stacked in a sandwich configuration for conducting electrical current. The plurality of busbars is mounted in a horizontal orientation with respective busbar sides extending vertically between a top-most busbar surface and a bottom-most busbar surface. The busway assembly further includes a pair of side-panels positioned, respectively, adjacent to the busbar sides for shielding the plurality of busbars. The side-panels include ventilation chimneys configured such that a vertically-enclosed path is formed between the bottom-most busbar surface and the top-most busbar surface. The vertically-enclosed path allows air or liquid to flow from a low area below the bottom-most busbar surface to an area above the top-most busbar surface.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Figure 1:
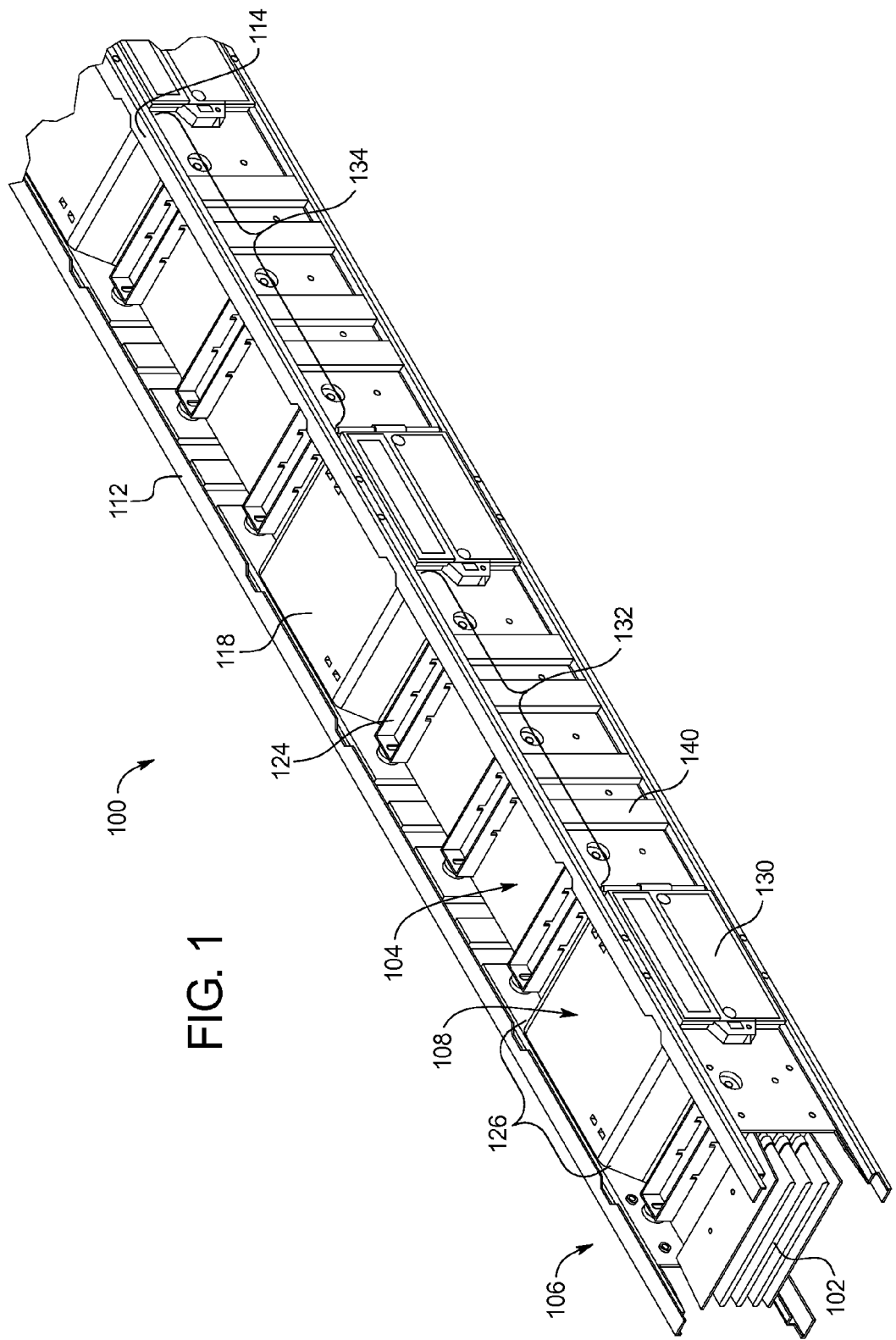
FIG. 1 is a perspective assembled view of a partial busway assembly.
Figure 2:
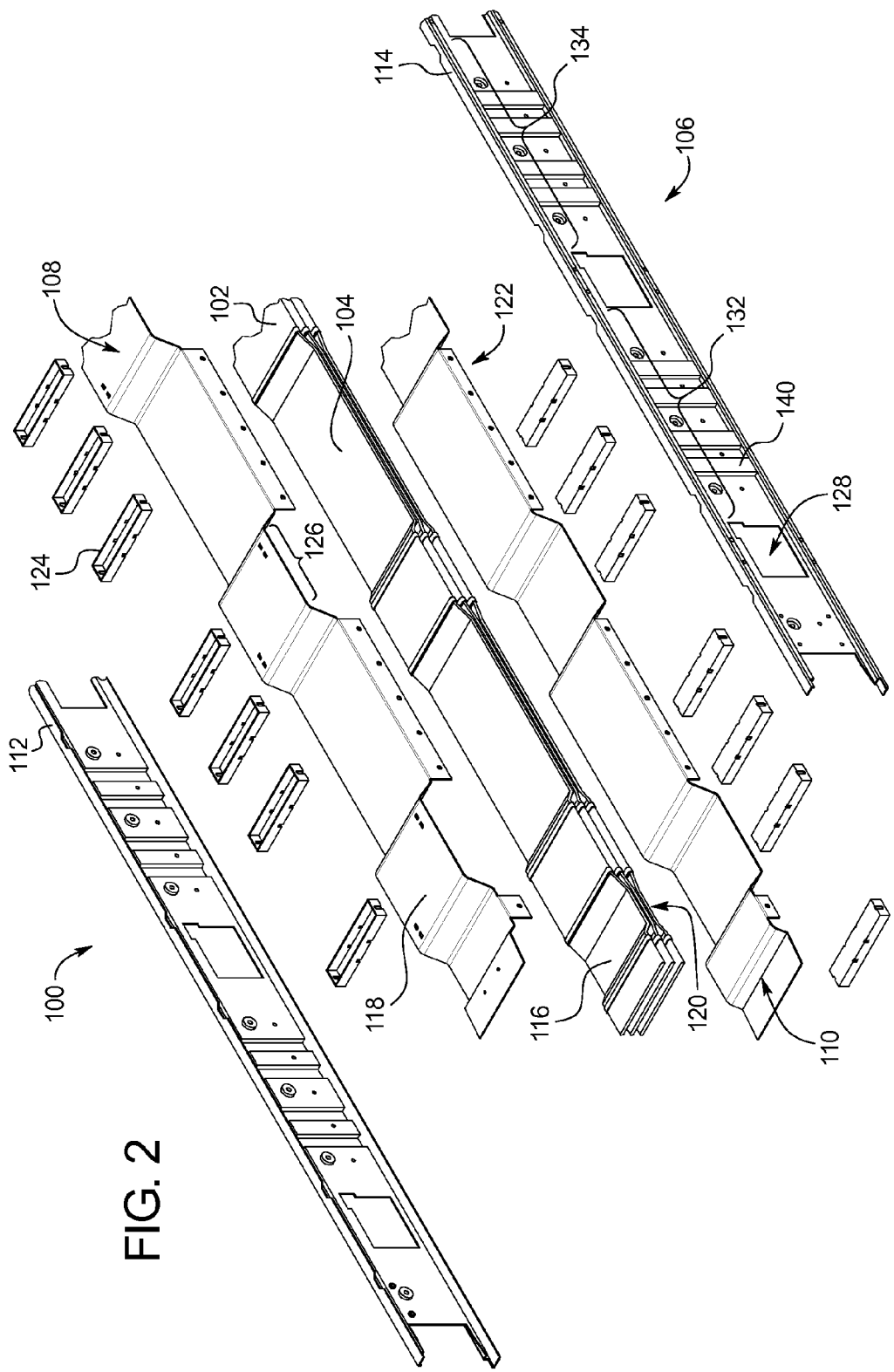
FIG. 2 is a perspective exploded representation of the assembly of FIG. 1.

Referring to FIGS. 1 and 2, a busway assembly 100 has a plurality of busbars 102 that are stacked in a sandwich configuration for conducting electrical current from an electrical source to various electrical loads. In the illustrated example, the busbars 102 include three stacked busbars. The busbars 102 carry electrical current in large quantities and typically have rectangular cross-sections, which optimize the current carrying capabilities of the material (e.g., copper or aluminum). The busbars 102 are insulated along flat areas 104 with materials such as epoxy powder coatings or mylar sheets.

The busway assembly 100 is intended to be horizontally-mounted, such that the busbars 102 are in a horizontal orientation. For example, the busway assembly 100 extends along the same floor of a building. As such, the busway assembly 100 is differentiated from vertically-mounted busways that, for example, extend vertically through floors of a building. According to one example, the busway assembly 100 is a SQUARE D brand I-LINE II busway manufactured by Schneider Electric USA, Inc. and rated for 800 amperes (and above).

The busbars 102 are enclosed within a housing 106 that includes a top housing 108, a bottom housing 110, and a pair of side-panels 112, 114. The top housing 106 is generally formed from structural aluminum sheeting and is used to cover a top-most surface 116 of the busbars 102 when the busbars 102 are stacked in the sandwich configuration. The top housing 108 has an exposed surface 118 that is, typically, painted. The bottom housing 110 is similar to the top housing 108. For example, the bottom housing 110 is also formed from structural aluminum sheeting and used to cover a bottom-most surface 120 of the busbars 102 when the busbars 102 are stacked in the sandwich configuration. The bottom housing 110 also has an exposed surface 122 that is, typically, painted. The bottom-most surface 120 of the busbars 102 and the exposed surface 122 of the bottom housing 110 are more clearly shown in FIG. 5. Based on the horizontal mounting of the busway assembly 100, the exposed surface 118 of the top housing 108 faces up and the exposed surface 122 of the bottom housing 110 faces down.

The side-panels 112, 114 include a left side-panel 112 and a right side-panel 114, which are symmetrically attached to the top housing 108 and the bottom housing 110. The side-panels 112, 114, similar to the top and bottom housings 108, 110, are formed from structural aluminum sheeting and are painted on both sides. In other examples, the top housing 108, the bottom housing 110, and the side-panels 112, 114 can be made using other manufacturing methods and/or materials. The side-panels 112, 114 provide structural support to the housing 106 and connect the top housing 108 and the bottom housing 110 around the busbars 102 to form an H-shaped configuration (as more clearly illustrated in FIG. 5).

For enhanced structural support, the housing 106 further includes a plurality of surge clamps 124 horizontally mounted at desired intervals above the top housing 108 and the bottom housing 110. In addition or alternative to structural support, the surge clamps 124 function as receptacles for receiving hardware, such as bolts or screws, to fasten the side-panels 112, 114 to each other. The surge clamps 124 help fasten the side-panels 112, 114 together and/or help prevent the busway assembly 100 from ripping itself apart when subjected to enormous forces generated by a short circuit.

The H-shaped configuration of the illustrated housing 106 is a standard configuration because electrical codes in the industry require busway assemblies to have a specific bending strength. Although the busbars 102 can be enclosed within the housing 106 in various manners, regardless of the specific components configuration, the busbars 102 are enclosed in a structurally rigid H-shaped housing (or ductwork) 106 that is typically made from aluminum or steel. The large amount of metal, of the busbars 102, that is enclosed within the housing 106 is extremely heavy and require an H-shaped configuration to resist sagging. This is especially true if, for example, the busway assembly 100 would suddenly become unsupported at one end or another.

The illustrated busway assembly 100 is a plug-in version of a high-amperage type of busway. The plug-in version includes humped areas 126 where switches and/or other downstream electrical distribution equipment can plug on to the busway assembly 100 to receive and supply electrical current to electrical loads, such as a motor or welding unit. The humped areas 126 are located in-between the flat areas 104 and are formed with a "humped" configuration to permit plugged-in equipment to tap into the busway assembly 100.

The side-panels 112, 114 include a plug-in opening 128 (FIG. 2) at each of the humped areas 126 for receiving the plugged-in equipment. A plug-in base 130 (FIG. 1) is typically mounted to cover at least in part the plug-in opening 128. The portions of the busway assembly 102 between each plug-in opening 128 are referred to as sections of the busway. For example, the illustrated busway assembly 100 has two adjacent sections 132, 134.

Alternatively, the busway assembly 100 can be a straight version in which stabs replace the humped areas 126. The stabs are un-insulated, formed pieces of copper that are welded to the busbars 102 for tapping electrical current. In the straight version, the busbars 102 are straight sections that do not have humps and, therefore, are not inherently divided into sections.

The side-panels 112, 114 further include a plurality of ventilation chimneys 140 for providing an airflow path for hot air trapped underneath the busbars 102. The chimneys 140 are located at each section 132, 134. Optionally, the chimneys 140 are arranged in pairs that are symmetrically arranged between successive plug-in openings 128.

Figure 3:
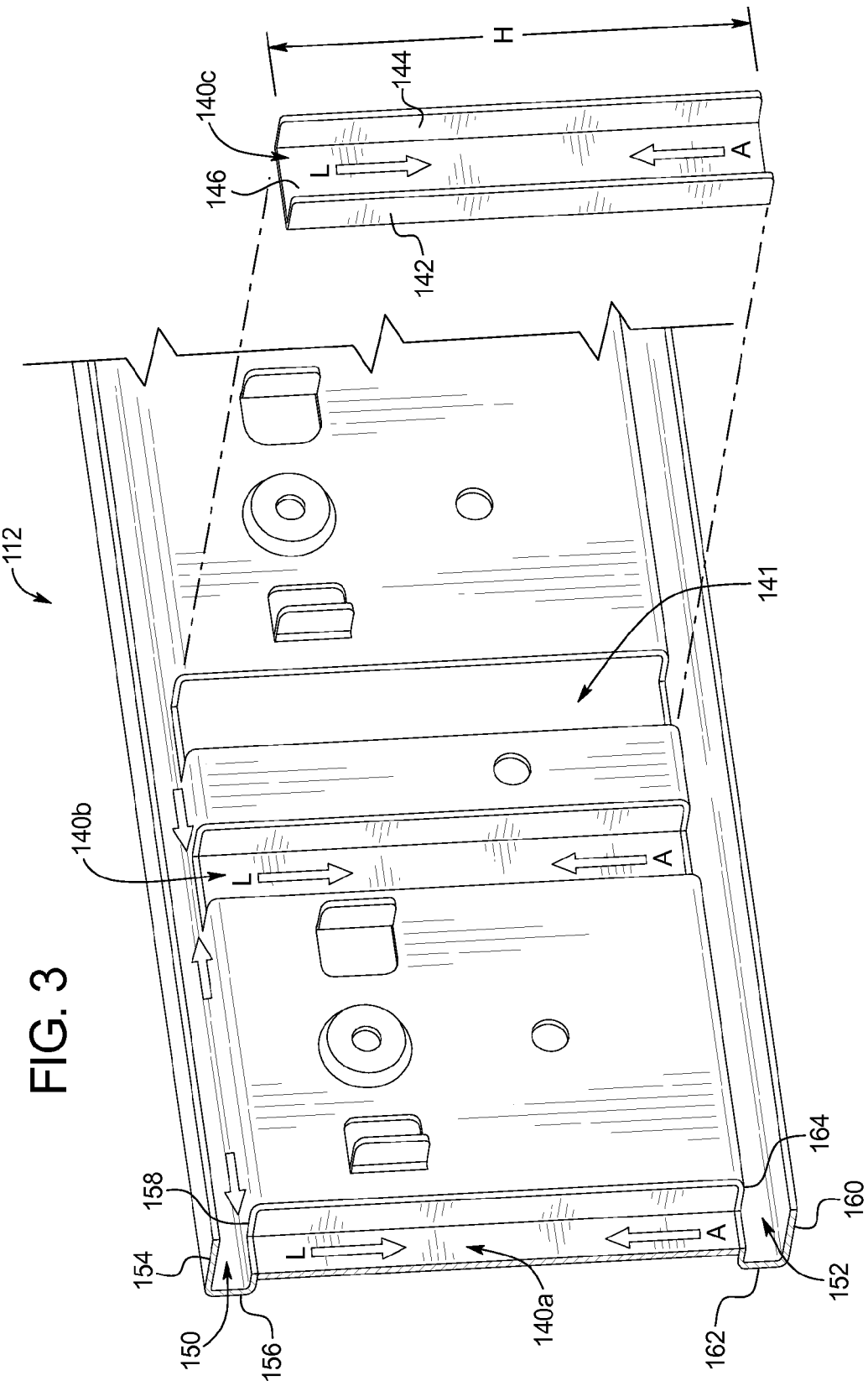
FIG. 3 is a perspective internal illustration of a side-panel portion with ventilation chimneys.
Figure 4:
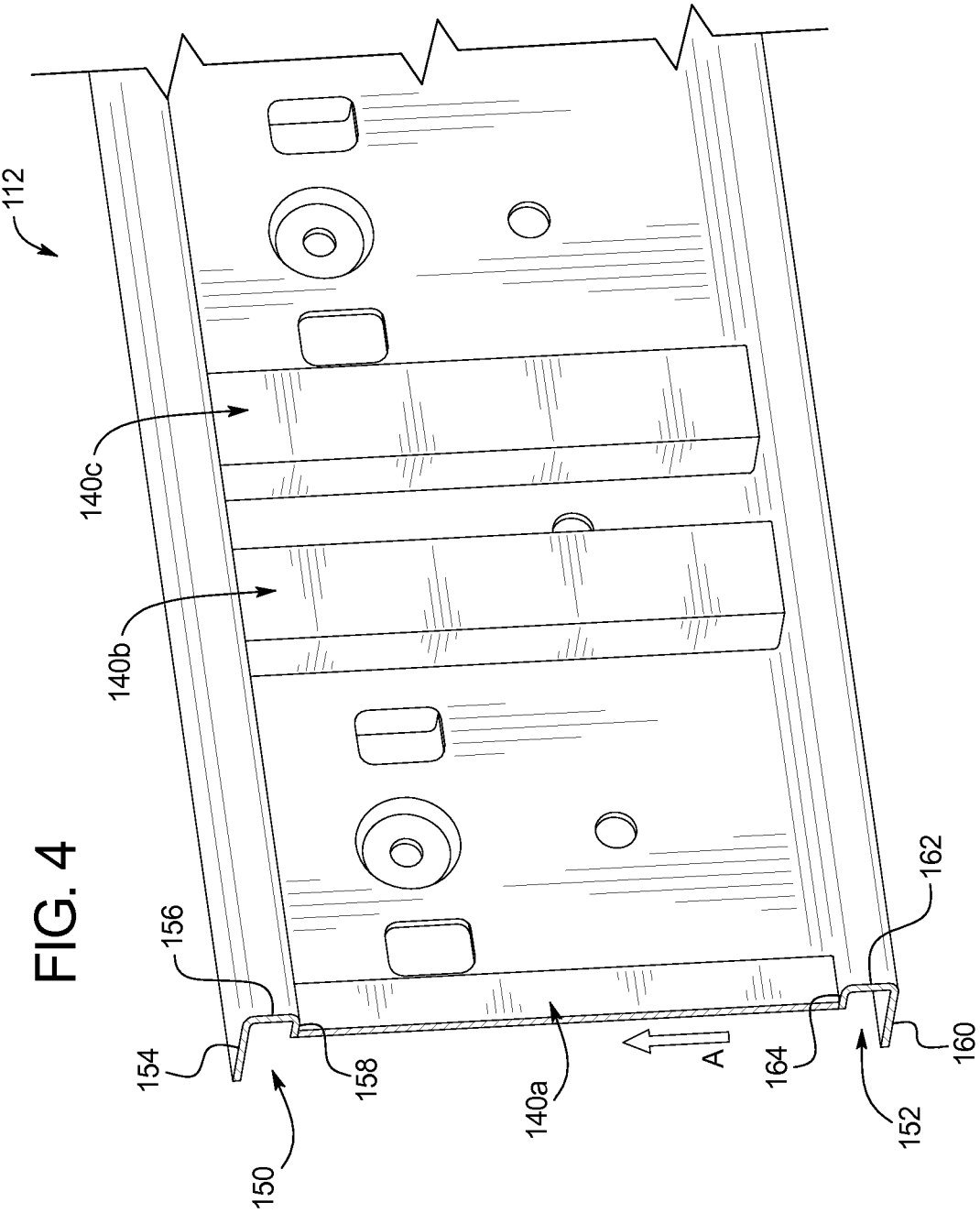
FIG. 4 is a perspective external view of the side-panel of FIG. 3.

Referring to FIGS. 3 and 4, the illustrated portion of the side-panel 112 shows three ventilation channels 140a-140c: a first ventilation chimney 140a (shown cross-sectioned), a second ventilation chimney 140b, and a third ventilation chimney 140c (shown removed in FIG. 3 for ease of understanding). The second and third ventilation chimneys 140b, 140c form a pair of chimneys. The ventilation channels 140a-140c are inserted into respective apertures of the side-panel 112, such as aperture 141. According to one example, the ventilation channels 140a-140c are welded to the side-panel 112 into respective apertures 141. Alternatively, the ventilation channels 140a-140c can be integrally formed with the side-panel 112 as part of the fabrication process.

The ventilation channels 140a-140c are formed as open-ended half-pipes having a rectangular cross-section along the height H. The rectangular cross-section provides a maximum volume flow. In an alternative embodiment, the ventilation channels 140a-140c have a semi-circular cross-sectional profile, which is easier to manufacture than a rectangular cross-sectional profile.

For ease of understanding, reference will be made only the third ventilation chimney 140c. However, it is understood that the description is applicable to other ones of the ventilation chimneys 140, including the first ventilation chimney 140a and the second ventilation chimney 140b. The ventilation chimney 140c includes two longitudinal sides 142, 144 that are connected via a central side 146 to form a U-shaped internal channel. Air A and/or liquids L can flow vertically along the internal path of the ventilation chimney 140c. The internal path is also referred to as a vertically-enclosed path, for air and/or liquid circulation.

The side-panel 112 further includes an upper trough 150 (or upper flange) at an upper end and a lower trough 152 (or lower flange) at a lower end. The upper trough 150 and the lower trough 152 are oriented horizontally and parallel to each other along the side-panel 112. The upper trough 150 is defined by a top side 154, a connecting side 156, and an internal side 158. The lower trough 152 is defined by a bottom side 160, a connecting side 162, and an internal side 164. If liquid accumulates within the upper trough 150, the ventilation chimneys 140a-140c provide a drainage path for the accumulated liquid to flow from the upper trough 150 towards the lower trough 152.

Figure 5:
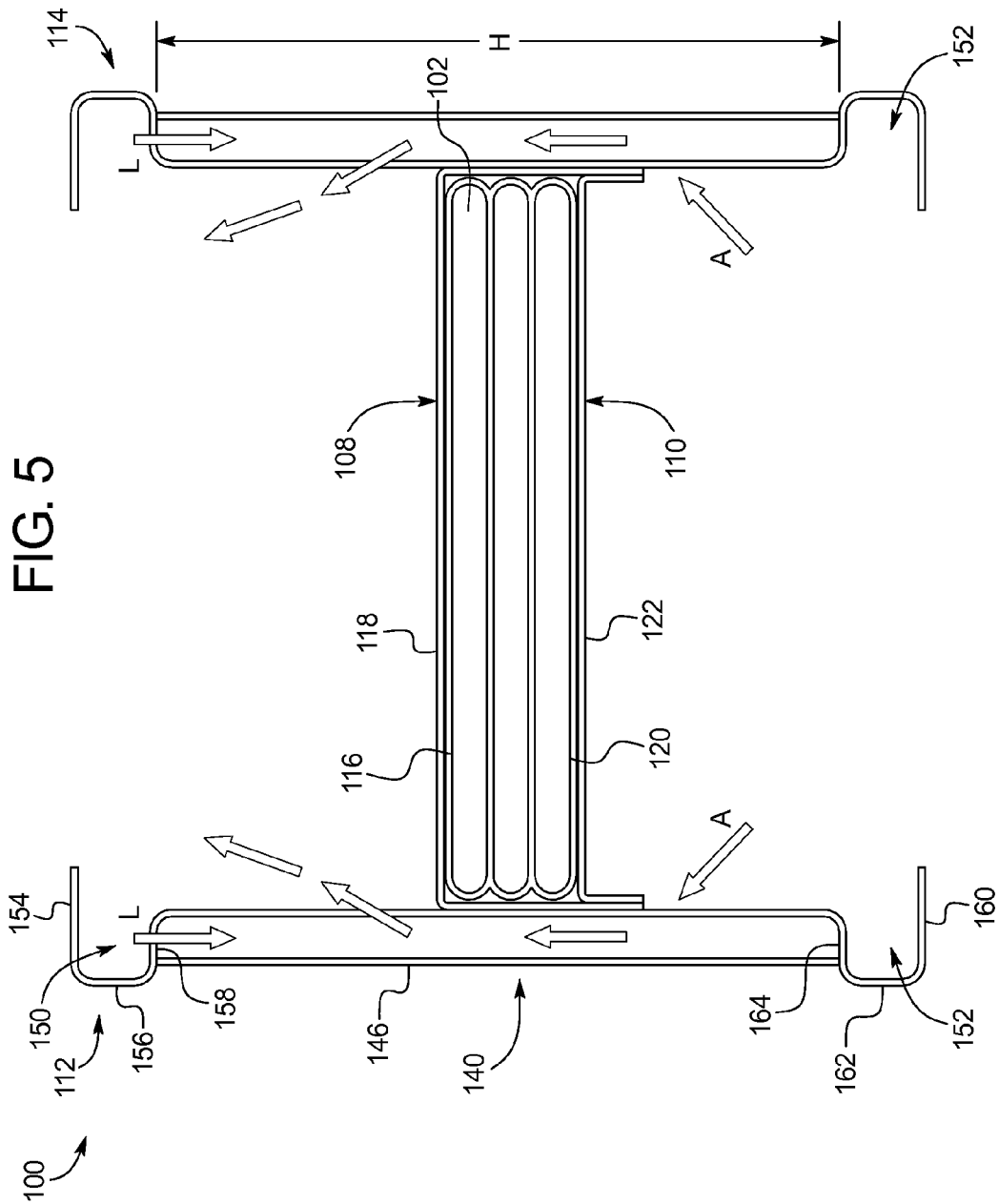
FIG. 5 is a cross-sectional illustration of the busway assembly of FIG. 1 with airflow patterns.

Referring to FIG. 5, the busway assembly 100 helps prevent stratification of hot air below the busbars 102, which, consequently, lowers the overall operating temperature of the equipment. In turn, by reducing the operating temperature of the system less conductor material is required for the same operating current, reducing the material costs of the busway assembly 100. For ease of understanding, reference numerals have been provided generally only in reference to the left side-panel 112, but it is understood that the right side-panel 114 is symmetrical to the left-side panel 112 in the illustrated embodiment.

Specifically, the busbars 102 generate heat due to the carried electrical current. Without the ventilation chimneys 140, some of the generated heat would be trapped as hot air in a low area below the bottom-most busbars surface 120. In particular, air stagnation points—in which the hot air would flow in a circular pattern—would otherwise be formed at the intersection of the side-panels 112, 114 with the bottom housing 110.

To prevent or reduce accumulation of hot air, especially around the air stagnation points, the ventilation chimneys 140 allow otherwise trapped hot air A to circulate upward to an upper area above the top-most busbar surface 116 and ventilate into the surrounding environment. Hot air A enters through a bottom end of the ventilation chimneys 140, near the bottom trough 152, flows along the vertically-enclosed path formed by the chimney sides 142, 144, and 146, and exits through a top end of the ventilation chimneys 140, near the upper trough 150. The flow of hot air A from underneath to above the busbars 102 reduces the temperature generated underneath the busbars 102. Thus, the air stagnation points are minimized as ventilation of the busbars underside is achieved and, consequently, the busbar assembly 100 achieves desirable cooling effects in an efficient manner that reduces associated costs and labor.

In addition to providing a path for the hot air A, the ventilation chimneys 140 further provide a path for liquid L accumulated in the upper trough 150 to drain away from the busway assembly 100. Accordingly, the ventilation chimneys 140 ensure that liquid L has a drainage path when the busway assembly 100 is subjected to rain or any conditions causing water and/or other liquids may collect in the upper trough 150. For example, accumulated rain water can drain away following the vertically-enclosed path from the top end to the bottom end of the ventilation chimneys 140 to prevent corrosion and/or other detrimental effects to the busway assembly 100.

Thus, the ventilation chimneys 140 provide many benefits, including improving water resistance capabilities and thermal performance characteristics of the busway assembly 100. In addition, the ventilation chimneys 140 help retain customer safety by not exposing the busbars 102 to the open air.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims. For example, according to alternative embodiments, the ventilation chimneys 140 can be applied to other electrical devices having internal heat generation and a cross-sectional profile that creates a cavity where hot air stratifies and reduces the ability of the system to shed heat to the environment.

What is claimed is:

1. A horizontally-mounted busway assembly comprising:
    a plurality of busbars stacked in a sandwich configuration for conducting electrical current, the plurality of busbars being mounted in a horizontal orientation; and
    a housing enclosing the plurality of busbars and having an H-shaped configuration relative to the horizontal orientation of the busbars, the H-shaped configuration including side-panels with ventilation chimneys through which hot air circulates from a low area underneath the plurality of busbars to an upper area above the plurality of busbars, the ventilation chimneys including open-ended half-pipes inserted in respective apertures of the side-panels so that the ventilation chimneys are open toward the busbars.

2. The busway assembly of claim 1, wherein the half-pipes have a rectangular or semi-circular cross-sectional profile.

3. The busway assembly of claim 1, wherein the housing includes a top housing connected to a bottom housing via the side-panels, each of the side-panels having a respective plurality of ventilation chimneys.

4. The busway assembly of claim 3, wherein the top housing is a structural sheet formed to cover a top surface of the plurality of busbars, the bottom housing being a structural sheet formed to cover a bottom surface of the plurality of busbars.

5. The busway assembly of claim 3, wherein the top housing and the bottom housing includes material selected from a group consisting of steel and aluminum.

6. The busway assembly of claim 3, further comprising surge clamps horizontally mounted between the side-panels for increasing structural rigidity of the housing.

7. The busway assembly of claim 1, wherein the plurality of busbars is separated into sections, the side-panels having a plug-in opening between two adjacent sections for access to electrical current for electrical loads.

8. The busway assembly of claim 7, further comprising a plug-in base mounted to cover at least in part the plug-in opening.

9. The busway assembly of claim 7, wherein each section of the plurality of busbars has two pairs of ventilation chimneys on each of the side-panels, the two pairs being symmetrically arranged between two successive plug-in openings.

10. The busway assembly of claim 1, wherein at least one of the side-panels includes an upper trough at an upper end of the ventilation chimneys and a lower trough at a lower end of the ventilation chimneys, the upper trough and the lower trough being oriented horizontally and parallel to each other, the ventilation chimneys providing a drainage path for accumulated liquid in the upper trough to flow towards the lower trough.

11. The busway assembly of claim 1, wherein each busbar of the plurality of busbars has a rectangular cross-section.

12. A horizontally-mounted busway assembly comprising:

a plurality of busbars stacked in a sandwich configuration for conducting electrical current, the plurality of busbars being mounted in a horizontal orientation with respective busbar sides extending vertically between a top-most busbar surface and a bottom-most busbar surface; and a pair of side-panels positioned, respectively, adjacent to the busbar sides for shielding the plurality of busbars, the side-panels including ventilation chimneys configured such that a vertically-enclosed path is formed between the bottom-most busbar surface and the top-most busbar surface, the ventilation chimneys being open toward the busbars and the vertically-enclosed path allowing air to flow from a low area below a bottom-most busbar to an upper area above a top-most busbar and liquid to flow from an upper area above the top-most busbar to a lower area below the bottom-most busbar.

13. The busway assembly of claim 12, wherein the ventilation chimneys are open-ended half-pipes having a rectangular or semi-circular cross-sectional profile.

14. The busway assembly of claim 13, wherein the open-ended half-pipes are attached within respective apertures of the side-panels.

15. The busway assembly of claim 14, wherein the open-ended half-pipes are welded to the side-panels.

16. The busway assembly of claim 12, further comprising a top housing connected to a bottom housing via the side-panels, the top housing shielding the top-most busbar surface and the bottom housing shielding the bottom-most busbar surface.

17. The busway assembly of claim 16, wherein the side-panels, the top housing, and the bottom housing, form a housing with an H-shaped configuration for enclosing the plurality of busbars.

18. The busway assembly of claim 17, further comprising surge clamps horizontally mounted between the side-panels for increasing structural rigidity of the housing.

19. The busway assembly of claim 12, wherein the plurality of busbars is separated into sections, the side-panels having a plug-in opening between two adjacent sections for supplying electrical current to electrical loads, each section having a symmetrical arrangement of ventilation chimneys in the side-panels.

20. The busway assembly of claim 12, wherein at least one of the side-panels includes an upper trough horizontally oriented at an upper end of the ventilation chimneys such that accumulated liquid in the upper trough can flow through the vertically-enclosed path of the ventilation chimneys.

* * * * *